May 29, 1934.  A. FLEISCHER  1,960,336
MANUFACTURE OF ALUMINA
Filed June 30, 1933
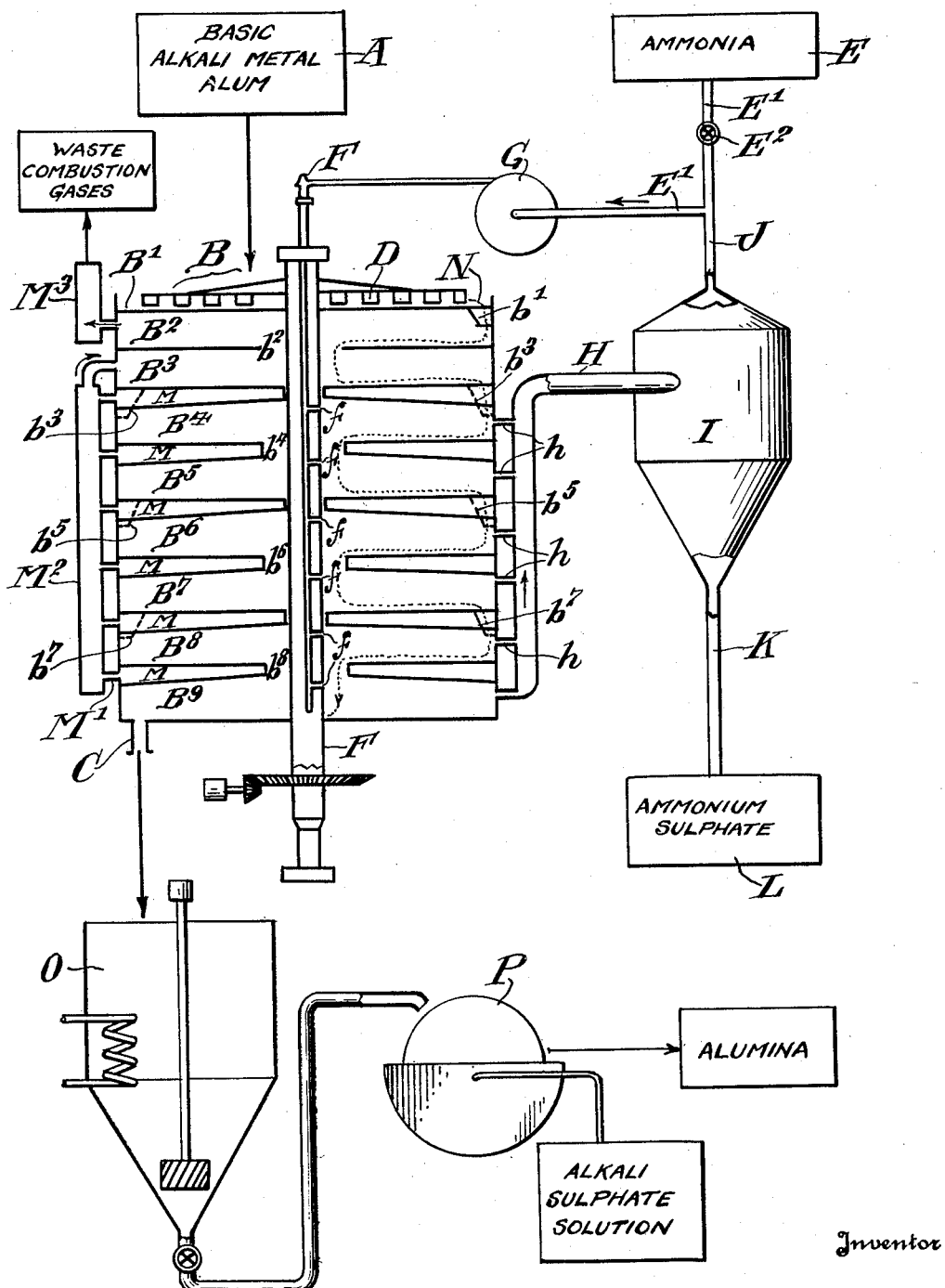

Patented May 29, 1934

1,960,336

UNITED STATES PATENT OFFICE 1,960,336

MANUFACTURE OF ALUMINA

Arthur Fleischer, Hartford, Conn., assignor to Kalunite Company, Philadelphia, Pa., a corporation of Delaware Application June 30, 1933, Serial No. 678,424

3 Claims. (Cl. 23—142)

My invention relates to the manufacture of a pure alumina from a starting material consisting of a substantially pure basic alkali metal alum, for example—

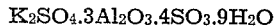

$$K_2SO_4.3Al_2O_3.4SO_3.9H_2O$$

the object of my invention being to provide an effective and economical process for the production of the alumina and the recovery of other values involved in the process and my invention consists, broadly speaking, in heating basic alkali metal alum in a muffle furnace to temperatures which will bring about a reaction between ammonia and the sulphur trioxide component of the aluminum sulphate constituent of the basic alum and effect the vaporization of the ammonium sulphate so formed, say between temperatures of 400° and 700° C., passing through said furnace a stream of ammonia gas to effect a reaction between the sulphur trioxide component of the basic aluminum sulphate constituent of the basic alum, driving off from said muffle furnace vaporized ammonium sulphate and unreacted ammonia and producing in said furnace a residual mass of alumina and alkali metal sulphate, withdrawing said residual mass from the furnace and leaching it with water to bring the alkali metal sulphate into solution and separating said solution from the insoluble alumina most conveniently by filtration. My method also involves for its most economical employment, a cooling of the gases and vapors withdrawn from the muffle furnace to temperatures which will effect the condensation of the vapors of water and ammonium sulphate and the separation therefrom of the ammonia gas for reuse and, by preference, I effect this separation by cooling the vapors escaping from the furnace to a temperature of approximately 90° C., at which temperature the vapors can be separated from the ammonia without taking the ammonia into solution. By preference, I first subject the basic alkali metal alum to a furnace treatment at sufficient temperature to vaporize and drive off any free moisture and then pass the dried product successively through two or more muffles, preferably six, through each of which muffles streams of ammonia gas are passed so that the ammonia comes successively into contact with material containing progressively less undecomposed basic alum so that in the final furnacing treatment a practically pure alumina in admixture with alkali metal sulphate will be discharged from the last muffle. The same result can, of course, be produced in a single muffle but would require a much longer time of treatment.

It will be understood that the treatment I have described involves the elimination from the basic alum of its water of crystallization and that this water will be condensed together with the ammonium sulphate and, to avoid loss of ammonia by solution in the water, it is advisable that the condensation of the sulphate and water should take place at temperatures not lower than 90° C. at which temperatures no appreciable ammonia will be taken into solution.

I have referred to the heating of the muffles at temperatures between 400° and 700° C. because at these temperatures the reaction described will take place and with progressively greater speed as the temperatures approach the higher limit. It is not advisable to heat the basic alum to temperatures above 700° C. because at higher temperatures the ammonium sulphate is decomposed with formation of nitrogen and sulphur dioxide and, therefore, loss of ammonia.

The preliminary elimination of free water from the basic alum will best be carried on in an open hearth furnace and at temperatures below 400° C.

My invention will perhaps be better understood as described in connection with the drawing which is a diagrammatic elevation of apparatus suitable for use in the practice of my process in a continuous fashion.

A represents a reservoir for basic alkali metal alum. B is a multiple hearth furnace, the make-up of which, as shown, consists of a feed hearth $B^1$ located at the top and communicating with an open hearth furnace chamber $B^2$ through a drop hole $b^1$. The open hearth furnace $B^2$ communicates with a second open hearth furnace chamber $B^3$ through an opening as indicated at $b^2$. Below the hearth $B^3$ I have indicated a series of muffle hearth furnaces indicated at $B^4$, $B^5$, $B^6$, $B^7$, $B^8$ and $B^9$ connected in series by drop holes indicated at $b^3$, $b^4$, $b^5$, $b^6$, $b^7$ and $b^8$, the lower muffle hearth having an outlet $b^9$ from which a conduit C leads to a leaching vat O which in turn is connected to a filter P. As indicated, M, M, are the muffles of the muffle hearths which are, of course, fed with fuel in any convenient way and from which the products of combustion pass through conduits $M^1$ connected with a main conduit $M^2$ leading into the open hearth furnace $B^3$ from which the gases pass into the open hearth $B^2$ and then by exhaust conduit $M^3$ to waste. Means are, of course, provided for stirring the material resting upon the hearth and shifting it in the direction of the outlet openings from each hearth, such, for instance, as rabbles, as indicated at D, in connection with the feed hearth $B^1$ and which rabbles D are attached to the shaft F¹. E indicates a reservoir for ammonia connected by a conduit E¹ to the muffle hearths, as shown, through a pipe F passing down through the center of the hollow shaft F¹ and communicating with each muffle hearth through branch pipes as indicated at f. I have indicated at E² a valve in the conduit E¹ and at G a fan located in said conduit. Each of the muffle hearth furnaces is provided with an outlet opening as indicated at h, each of said openings communicating with a conduit H which in turn leads to a separating and condensing device or devices indicated in the drawing as a cyclone separator I. From this device I have indicated at J a conduit for gas leading, as shown, to the conduit E¹. From the conical bottom of the separator I, I have indicated a conduit K leading to a storage reservoir indicated at L. I have indicated by the dotted line N the path of the solid material from the feed hearth B¹ to the final muffle hearth B⁹.

In operation, basic alkali metal alum is fed from the reservoir A to to the feed hearth B¹ and thence through the lower furnace chambers, as indicated by the dotted line N, and substantially pure alumina in admixture with alkali metal sulphate is drawn from the muffle hearth B⁹ through conduit C in to the leaching vat O where the alkali metal sulphate is brought into solution which can then be readily separated from the insoluble alumina as indicated by being passed through a filter press indicated at P. The feed hearth B¹ is, as shown, heated only through its floor partition, separating it from the open hearth B² and the open hearth furnaces B² and B³ are heated, as indicated, by flue gases escaping from the muffles. The temperature maintained in the open hearth chamber B³ should be approximately 300° C. and approximately 150° C. for the furnace chamber B², which temperatures will insure prompt drying of the basic alum. The dry basic alum then passes progressively through the muffle hearth furnaces, the temperature of which is so regulated by the combustion of gases in the muffles M as not to exceed a temperature at which the ammonium sulphate will be decomposed and sufficiently high to insure a reaction between the ammonia and the sulphur trioxide constituent of the aluminum sulphate component of the basic alkali metal alum and sufficiently high to insure the progressive vaporization of the ammonium sulphate and its final complete elimination in the final muffle hearth furnace. This temperature in the upper muffle hearth furnaces should not be permitted to exceed 700° C. but in the extreme lower furnace or furnaces a higher temperature would not be detrimental as the ammonium sulphate would be practically eliminated in the upper muffle hearths. Ammonia is fed to the muffle hearth furnaces from the reservoir E through the conduits E¹, F and f and the gaseous and vaporous products of each muffle hearth passes from the hearths through the conduits h and main conduit H to the condenser and separator I, in which the temperature of these products should be reduced to approximately 90° C. so as to effect the condensation of the water vapor and ammonium sulphate without taking into solution ammonia and the ammonia escapes from the condenser and separator through conduit J which communicates with the conduit E¹, the separated materials, ammonium sulphate and water, are drawn from the separator condenser, as indicated at K.

I have, in my copending application, filed June 30, 1933, Serial Number 678,423 described and claimed a similar process for treating basic ammonium alum with a residual product, in the last muffle furnace, of pure alumina. In my present process the residual product from the muffle hearth furnace treatment is alumina in admixture with an alkali metal sulphate and pure alumina is only obtained after bringing the alkali metal sulphate into solution and separating it from the alumina.

Having now described my invention, what I claim as new and desire to secure by Letters Patent, is:

1. The method of manufacturing alumina from basic alkali metal alum as a starting material which consists in heating the basic alkali metal alum in a muffle furnace to temperatures between 400° and 700° C., contacting said heated alkali metal basic alum with ammonia gas passing through the heated muffle to effect a reaction between the ammonia and the sulphur trioxide constituent of the aluminum sulphate component of the basic alum with formation of a residual mixture of alumina and alkali metal sulphate and the separation therefrom of the ammonium sulphate in vapor form passing from the muffle in admixture with unreacted ammonia, withdrawing residual solids from the furnace, separating the alumina from said residual solids by bringing the alkali metal sulphate into solution and separating the alumina therefrom by filtration.

2. The method of claim 1, in which the ammonium sulphate and water vapors drawn from the furnace, together with admixed ammonia, are condensed and the ammonia separated therefrom for further use.

3. The method of claim 1, in which the basic alum is heated to eliminate free water before being subjected to treatment in the muffle furnace.

ARTHUR FLEISCHER.